(12) United States Patent
Creager

(10) Patent No.: US 12,229,740 B2
(45) Date of Patent: Feb. 18, 2025

(54) DYNAMIC QUICK LINK GENERATION SYSTEM

(71) Applicant: Truist Bank, Charlotte, NC (US)

(72) Inventor: James Harrison Creager, Raleigh, NC (US)

(73) Assignee: Truist Bank, Charlotte, NC (US)

( * ) Notice: Subject to any disclaimer, the term of this patent is extended or adjusted under 35 U.S.C. 154(b) by 67 days.

(21) Appl. No.: 17/898,878

(22) Filed: Aug. 30, 2022

(65) Prior Publication Data

US 2024/0070633 A1 Feb. 29, 2024

(51) Int. Cl.
*G06Q 20/10* (2012.01)
*G06F 9/451* (2018.01)

(52) U.S. Cl.
CPC ........... *G06Q 20/108* (2013.01); *G06F 9/451* (2018.02)

(58) Field of Classification Search
CPC .............................. G06Q 20/108; G06F 9/451
USPC ........................................................ 705/42
See application file for complete search history.

(56) References Cited

U.S. PATENT DOCUMENTS

| 2013/0080539 A1* | 3/2013 | Jan .......................... H04L 67/02 709/227 |
| 2014/0114742 A1* | 4/2014 | Lamontagne ...... G06Q 30/0242 705/14.41 |
| 2019/0129727 A1* | 5/2019 | Bovet .................... H04L 67/306 |
| 2022/0342945 A1* | 10/2022 | Dagar .................... G06N 20/00 |

* cited by examiner

*Primary Examiner* — Cho Yiu Kwong
(74) *Attorney, Agent, or Firm* — Kilpatrick Townsend & Stockton LLP; Michael A. Springs, Esq.

(57) ABSTRACT

A computer-implemented method includes receiving a trigger to generate a quick link and accessing user action information associated with a set of user device interactions with a user interface. The method also includes determining at least one qualifying user device interaction of the set of user device interactions using the user action information. Additionally, the method includes generating at least one quick link that automatically performs an action associated with the at least one qualifying user device interaction upon manipulation of the at least one quick link by a user in the user interface. Further, the method includes populating the user interface with the at least one quick link.

18 Claims, 5 Drawing Sheets

FIG. 5

DYNAMIC QUICK LINK GENERATION SYSTEM

TECHNICAL FIELD

This disclosure generally relates to communications networks and, more specifically (but not by way of limitation) to web-based communications systems to effectuate changes in separate systems.

BACKGROUND

Web-based systems, particularly ones that impact other systems, can require significant user knowledge for navigating various options and selections including in the web-based systems to effectuate the impact on other systems. Web-based systems may also involve terminology and processes specific to particular industries, rather than terminology accessible to a wide variety of potential users. Furthermore, web-based systems often have user interface designs per type of device (e.g., laptop or mobile device), but are not responsive to screen size per type of device. User interfaces often fail to guide users in providing the needed information quickly such that multiple exchanges of web pages and information are necessary, which involve increased bandwidth and system usage.

SUMMARY

In one example, a system includes a processing device and a non-transitory computer-readable medium including instructions that are executable by the processing device to cause the processing device to perform operations. The operations include receiving a trigger to generate a quick link and accessing user action information associated with a set of user device interactions with a user interface. The operations also include determining at least one qualifying user device interaction of the set of user device interactions using the user action information. Additionally, the operations include generating at least one quick link that automatically performs an action associated with the at least one qualifying user device interaction upon manipulation of the at least one quick link by a user in the user interface. Further, the operations include populating the user interface with the at least one quick link.

In another example, a computer-implemented method includes receiving a trigger to generate a quick link and accessing user action information associated with a set of user device interactions with a user interface. The method also includes determining at least one qualifying user device interaction of the set of user device interactions using the user action information. Additionally, the method includes generating at least one quick link that automatically performs an action associated with the at least one qualifying user device interaction upon manipulation of the at least one quick link by a user in the user interface. Further, the method includes populating the user interface with the at least one quick link.

In another example, a non-transitory computer-readable medium including instructions that are executable by a processing device for performing operations. The operations include receiving a trigger to generate a quick link and accessing user action information associated with a set of user device interactions with a user interface. The operations also include determining at least one qualifying user device interaction of the set of user device interactions using the user action information. Additionally, the operations include generating at least one quick link that automatically performs an action associated with the at least one qualifying user device interaction upon manipulation of the at least one quick link by a user in the user interface. Further, the operations include populating the user interface with the at least one quick link.

BRIEF DESCRIPTION OF THE DRAWINGS

FIG. 5 is a user interface of an accounts overview including the dynamically generated quick links according to one example.

DETAILED DESCRIPTION

The present disclosure relates to networked, web-based systems for dynamically generating quick links, among multiple available actions, in separate systems easily. By way of one example, a system can automatically generate links to transfer funds electronically and in a networked manner. Certain examples provide a user interface that facilitates quick links in a client-optimized, responsive design approach.

For example, a user interface may be provided that is adjustable using dynamic quick links based on user interactions with the user interface. In some examples, users may repeatedly perform tasks in the user interface by transitioning through multiple intermediate pages of the user interface. The user interface may track such tasks and dynamically generate quick links that enable skipping one or more intermediate pages of the user interface. The quick link options can be conveniently located on each page of the user interface.

Examples of a user interface can be optimized for any screen size, desktop PC, tablet, or mobile phone, and can be touch-enabled. For example, the user interface can intelligently adapt to the device on which it is rendered. Information can be grouped into widget-like containers that may be expanded or collapsed based on user preference. The set preferences can be saved and can be displayed appropriately each time the user logs onto the interface. Large tables of information can be avoided to accommodate smaller screen sizes.

In some examples, a user interface according to certain examples can present clients with options conveniently placed in one location for performing recurring operations. The simplified processes can streamline flows for common transactions or information requests at the user interface. In some examples, the dynamic quick links that enable the options may be generated based on an automated analysis of user interactions within the web page. The term "transaction," as used herein, may refer to any event that is accomplished by a user through the user interface. For example, the transactions described below may include both transaction requests (e.g., for a transaction to occur at a later date) and the actual transactions (e.g., a transaction intended to occur immediately).

Figure 1:
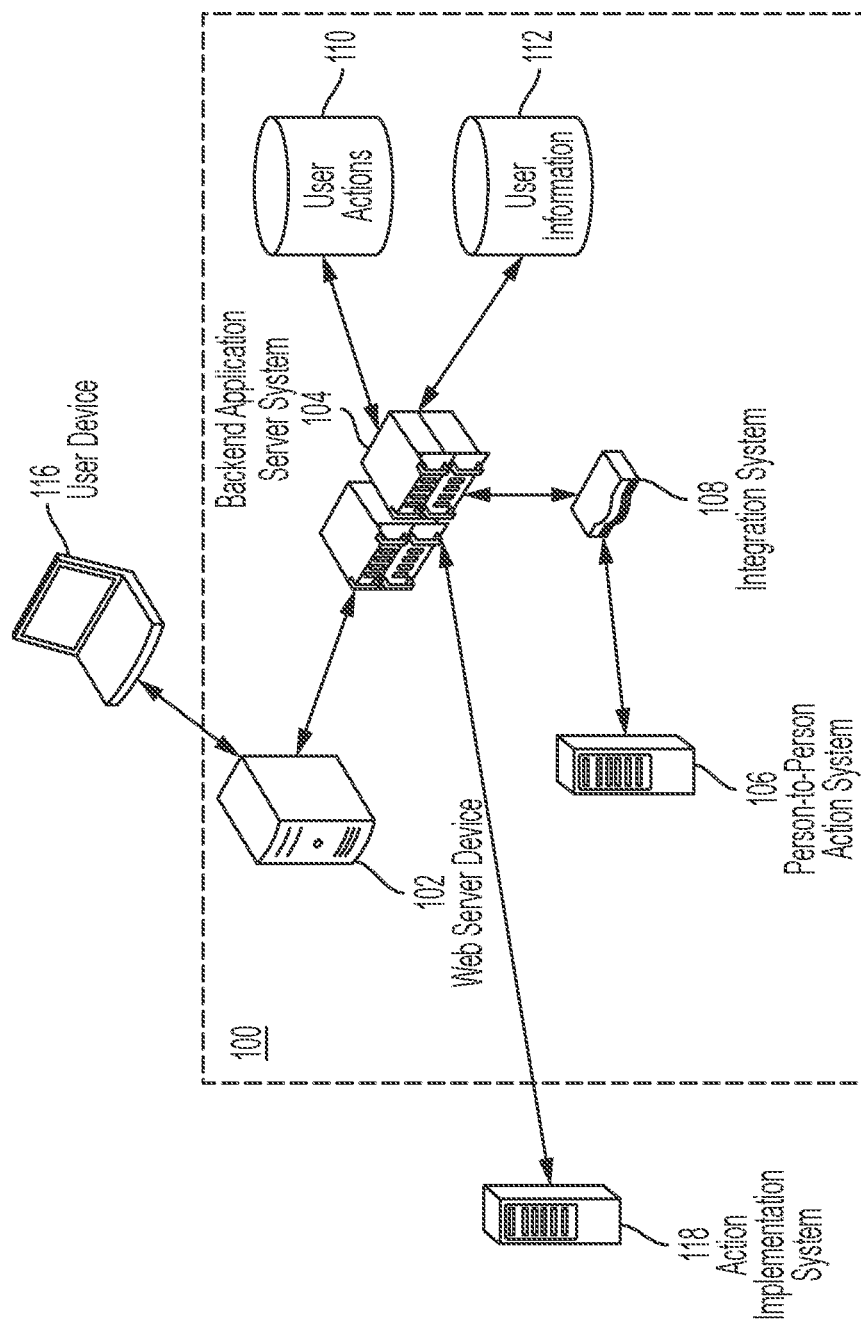
FIG. 1 depicts a schematic diagram of a system for managing implementation of an action according to one example.

Certain examples can be implemented in a networked and electronic system. FIG. 1 depicts an example of a networked and electronic system 100 in which various processes can be implemented using server devices and database devices. The system 100 includes a web server device 102, a backend application server system 104, a person-to-person action system 106 communicatively coupled to the backend application server system 104 through an integration system 108, and certain database devices communicatively coupled to the backend application server system 104. An example of the person-to-person action system 106 is a person-to-person payment system. The integration system 108 can format requests and commands for the person-to-person action system 106 so that the person-to-person action system 106 can effectuate an action through networked communication with other accounts, systems, and currencies. In some examples, the integration system 108 is separate from the system 100. The integration system 108 can create a layer of isolation between systems, such as if one or more of the systems is an external system, to reduce the complexity of replacing systems and to improve allowing other applications easy access to those systems.

The database devices include a user action database device 110 and a user information database device 112. The user action database device 110 can include historical information associated with a user about activities previously performed by the user in connection with account transactions. The user information database device 112 can include user identifications associated with user account information and, in some examples, user demographic information. In some examples, the database devices 110, 112 are implemented as logical databases, such as virtual machines or devices, rather than on separate devices.

The web server device 102 can communicate over a network with a user device 116. The user device 116 may be a computing device, such as a laptop, mobile phone, desktop, personal digital assistant, tablet, etc., that can display content in a web browser or other interface. For example, the web server device 102 can generate user interfaces and provide the user interfaces to the user device 116 over the network. The web server device 102 can also receive requests and commands from the user device 116, and configure the user interfaces to be provided to the user device 116 in response to the requests and commands.

The backend application server system 104 can communicate with an action implementation system 118. The action implementation system 118 may be part of the system 100 or separate from the system 100. The action implementation system 118 can dynamically generate quick links usable by the user in the user interface. The action implementation system 118 may leverage the data stored in the database devices 110, 112 to determine personalized quick links for the user. In some examples, the action implementation system 118 may include one or more trained machine-learning models that are applied to the data stored in the database devices 110, 112 to determine quick link operations that are the most relevant to a particular user. For example, the machine learning models may identify specific transactions (e.g., credit card payments, payments to individuals, mortgage payments, etc.) that the user most often navigates to through the user interface. The backend application server system 104 can exchange data and commands, electronically or optically, with database devices, the web server device 102 and the person-to-person action system 106 through the integration system 108.

Figure 2:
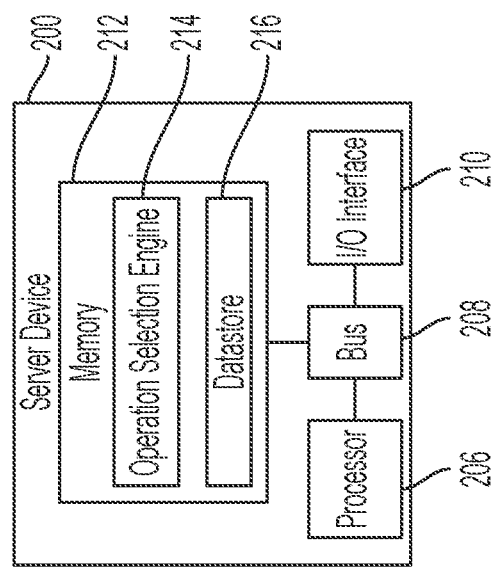
FIG. 2 depicts a block diagram of a server device usable in the system of FIG. 1 according to one example.

FIG. 2 depicts a block diagram of a server device 200 or system. One or more of the web server device 102, backend application server system 104, the person-to-person action system 106, and the integration system 108 of FIG. 1 may each include the type of components depicted in FIG. 2.

The server device 200 can include a processor 206, a memory 212, and a bus 208. The memory 212 includes a tangible, computer-readable memory on which code is stored. The processor 206 can execute code stored in the memory 212 by communication via the bus 208 to cause the server device 200 to perform actions. The server device 200 can include an input/output (I/O) interface 210 for communication with other components, such as a network, other server devices, and external systems. The server device 200 may be any device that can process data and execute code that is a set of instructions to perform actions. Examples of the server device 200 include a database server, a web server, desktop personal computer, a laptop personal computer, a handheld computing device, and a mobile device.

Examples of the processor 206 include a microprocessor, an application-specific integrated circuit (ASIC), a state machine, or other suitable processor. The processor 206 may include one processor or any number of processors. The processor 206 can access code stored in the memory 212 via the bus 208. The memory 212 may be any non-transitory, computer-readable medium configured for tangibly embodying code and can include electronic, magnetic, or optical devices. Examples of the memory 212 include random access memory (RAM), read-only memory (ROM), a floppy disk, compact disc, digital video device, magnetic disk, an ASIC, a solid state device, a configured processor, or other storage device.

Instructions can be stored in the memory 212 as executable code. The instructions can include processor-specific instructions generated by a compiler or an interpreter from code written in any suitable computer-programming language. The instructions can include an application, such as an operation selection engine 214, that, when executed by the processor 206, can cause the server device 200 to dynamically generate a user interface or a series of user interfaces that include quick links for performing various operations. The memory 212 can also include a datastore 216 in which content and data can be stored.

Figure 3:
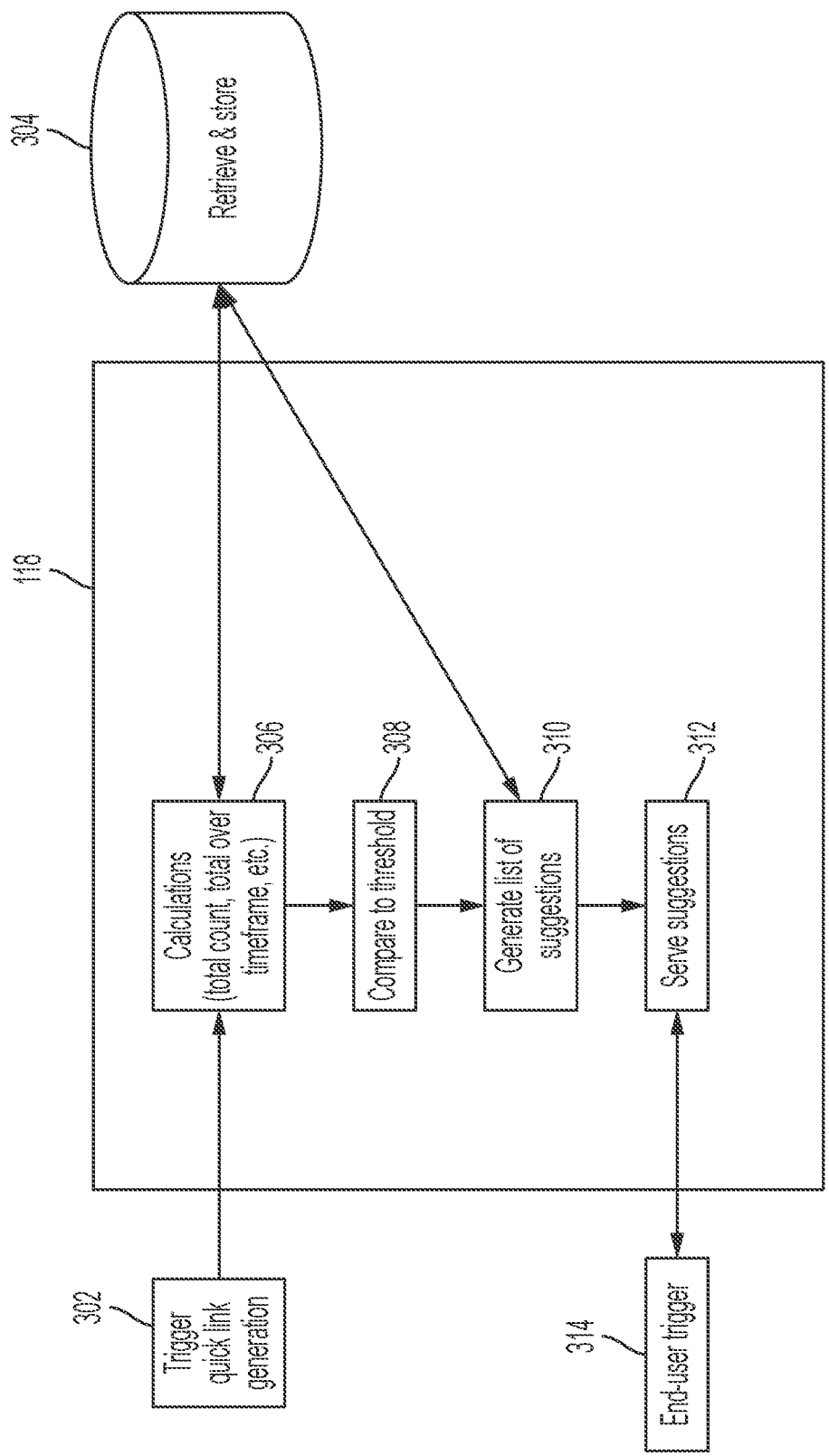
FIG. 3 is a block diagram depicting dynamic generation of quick links according to one example.

FIG. 3 is a block diagram depicting dynamic generation of quick links according to one example. In an example, the action implementation system 118 may perform operations that generate the quick links for a user interface presented to the user device 116. The action implementation system 118 may receive a triggering event 302 to begin a dynamic quick link generation process. The triggering event 302 may be any time a transaction form is generated by a user. The transaction form may be a form that instructs a bank to transfer money to another person, to pay a bill, to make a payment on a loan, or any other actions that the bank may perform as instructed by the user.

A retrieval and storage database device 304, which may be part of the database devices 110, 112, may store instances of form generation by a user and may be used by the action implementation system 118 to obtain information about transactions and to store generated quick links. In some examples, the action implementation system 118 may perform calculations 306 that track transaction events. For example, a total count of particular transaction events, a total count over a time period of particular transaction events, a percentage of a particular transaction event compared to total transactions, etc. may all be tracked by the action implementation system 118. The action implementation system 118 may store data associated with tracking the transactions at the retrieval and storage database device 304.

In addition, the action implementation system 118 can store data associated with field values, metadata context, and preceding behaviors associated with various events at the retrieval and storage database device 304. The data associated with the field values may include the information a user enters while going through an event flow. In a transfer example, the data may include a date selected for a transaction to occur, which accounts to transfer between, how much money to transfer, etc. Further, the action implementation system 118 can also calculations about the fields and values that the action implementation system 118 can use to create the quick links. For example, a user might make a transfer from checking to savings every Monday, but sometimes the amount varies. When the action implementation system 118 creates a quick link for this action, the action implementation system 118 may determine that the quick link will prepopulate the "to and from" accounts and the date, but the amount field may be handled differently based on how consistent or inconsistent the amount values are over time.

By way of example, if the amount is very consistent (e.g., the same 80% of the time), then the amount might be automatically populated when the user activates the quick link. If a few different amounts are fairly consistently used (e.g., $50 30% of the time, $75 25% of the time, $100 40% of the time), then those three options may be presented as clickable chips or buttons for the amount field. If the amount is extremely inconsistent (e.g., no amount repeated more than once), then the amount may be left blank and the user can type in the amount when the user activates the quick link.

The metadata context, which may also be stored at the retrieval and storage database device 304 by the action implementation system 118, refers to information such as a location of where a page transaction was started (e.g., dashboard, account page, etc.) or the date and time the money movement event occurred. This information may inform where the action implementation system 118 places the quick link in an interface or when to show the quick link. For example, if the user makes the transfer on a Tuesday 75% of the time, then the action implementation system 118 can generate quick link for display in the interface on Tuesdays. Further, the information associated with preceding behaviors, which may also be stored at the retrieval and storage database device 304 by the action implementation system 118, may refer to information that the user was doing prior to the transaction event. This information may impact where the quick link is displayed in the interface. For example, if a user tends to review transactions and then pay a bill, then the action implementation system 118 may generate a bill pay quick link for display in the interface near the transactions table.

In some examples, a quick link may be proposed when the tracked calculations 306 are compared to a threshold 308. In some examples, the threshold may be when a particular transaction occurs a set number of times or exceeds a percentage of the overall transactions performed by the user. In another example, the threshold may be replaced by one or more machine-learning models. For example, a machine-learning model may be trained to identify transactions from a list of transactions performed by a user that would provide the most relevant quick links. In some examples, the machine-learning model may be trained to identify quick links that would reduce a number of user inputs to re-generate a particular transaction. In other examples, the machine-learning model may be trained to identify transactions for quick link generation that are most likely to recur over a particular time period.

Once the transactions are identified, a list of suggestions 310 may be generated and served 312 to the user when an end-user trigger 314 is received by the action implementation system 118. The end-user trigger 314 may occur when the user opens a home screen and selects a request to receive quick link suggestions. In some examples, the quick link suggestions may appear automatically when the user logs into an account.

Additionally, the action implementation system 118 may dynamically adjust displayed quick links in the user interface based on a ranking system. For example, if a user opts to add a quick link to the user interface, the action implementation system 118 may add the quick link and remove a quick link that is the least used by the user from a pre-existing set of quick links. In some examples, the action implementation system 118 may automatically generate a new set of quick links when the threshold 308 is reached for a particular transaction. In such an example, the action implementation system 118 may generate the new set of quick links without further input from the user. Additionally, an order of quick links may be generated based on the frequency of use of the quick links by the user. For example, the most frequently used quick links may be positioned at a top of a list of quick links or furthest left on a list of quick links.

Additionally, the action implementation system 118 may track a user's continued use of non-quick link interactions with the user interface presented on the user device 116. In some examples, the action implementation system 118 may rearrange the quick links based on the non-use of the quick link by the user in favor of other user inputs to perform a transaction. The rearrangement of the quick link may place the quick link in a location of the user interface that is more visible to the user such that the user is able to discover the quick link for future use.

Figure 4:
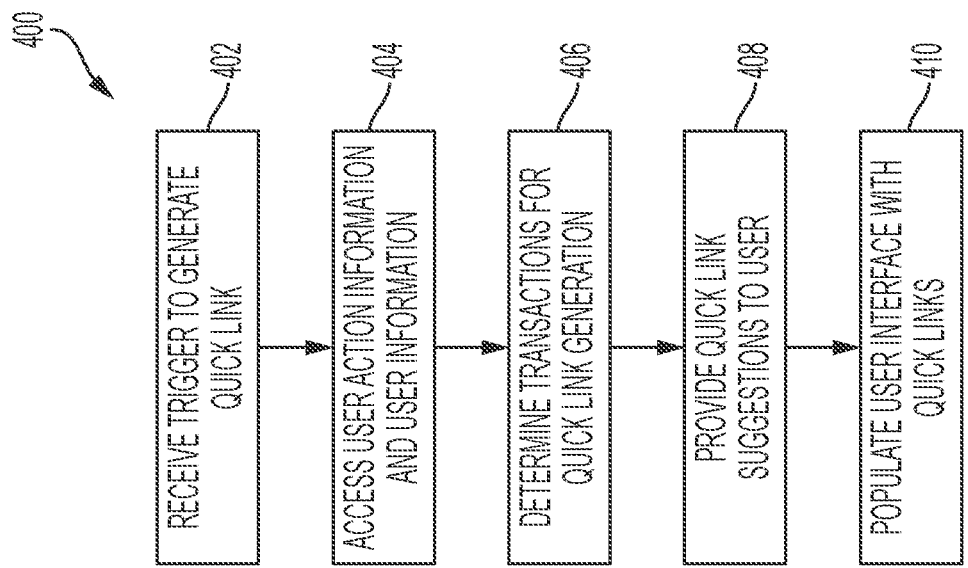
FIG. 4 is a flowchart of a process for dynamic generation of quick links according to one example.

FIG. 4 is a flowchart of a process 400 for dynamic generation of quick links according to one example. At block 402, the process 400 involves receiving a trigger to generate a quick link. In some examples, the trigger includes a user selecting a button on a homepage that requests new quick link suggestions. In an additional example, the trigger may include receiving a new transaction and determining that the new transaction exceeded a predetermined threshold for a particular transaction.

At block 404, the process 400 involves accessing user action information and general user information. The user action information may include information about all transactions performed by the user over a specified period of time. The user information may include general information about the user. For example, the user information may include historical information associated with a user identification about activities previously performed by the user in connection with account transactions and user identifications associated with user account information and, in some examples, user demographic information.

At block 406, the process 400 involves determining transactions for quick link generation. In some examples, the transactions may be determined by determining whether a particular transaction has been performed enough times to exceed a threshold. In additional examples, machine-learning models may be trained to identify transactions that are most likely to be used by a user based on inputs of the user action information and the user information.

At block 408, the process 400 involves providing a quick link suggestion to a user. The quick link suggestion may be accepted or rejected by the user. In some examples, the process 400 may provide a plurality of quick link suggestions from which the user may approve or reject. In still further examples, the process 400 may involve automatically selecting quick links absent user interaction.

At block 410, the process 400 involves populating the user interface with the approved or otherwise selected quick links. In some examples, the process 400 may automatically populate the user interface with the suggested quick links before receiving approval from the user. The dynamic quick links, when selected, may avoid requirements for the user to repetitively input information associated with transactions that are commonly requested by the user. This may save time for the user and may improve the user's overall experience with the user interface.

In some examples, populating the user interface with the quick links may be done while taking into account when and where the quick links appear. For example, if a user has a separate dashboard for personal and business accounts, then the action implementation system 118 may generate different quick links that are displayed on each dashboard depending on the accounts that are used in the quick link transactions (e.g., business or personal accounts). Additionally, if a user performs certain behaviors prior to initiating transactions, then the action implementation system 118 may position the quick links in the dashboard near where the user performs the behaviors. For example, if the user reviews transactions before paying a bill, the action implementation system 118 may position the quick link near a transactions table. Further, if a user pays the same bill on the first Tuesday of the month multiple times, then the action implementation system 118 may generate the quick link the first Tuesday of every month but not on other days.

Figure 5:
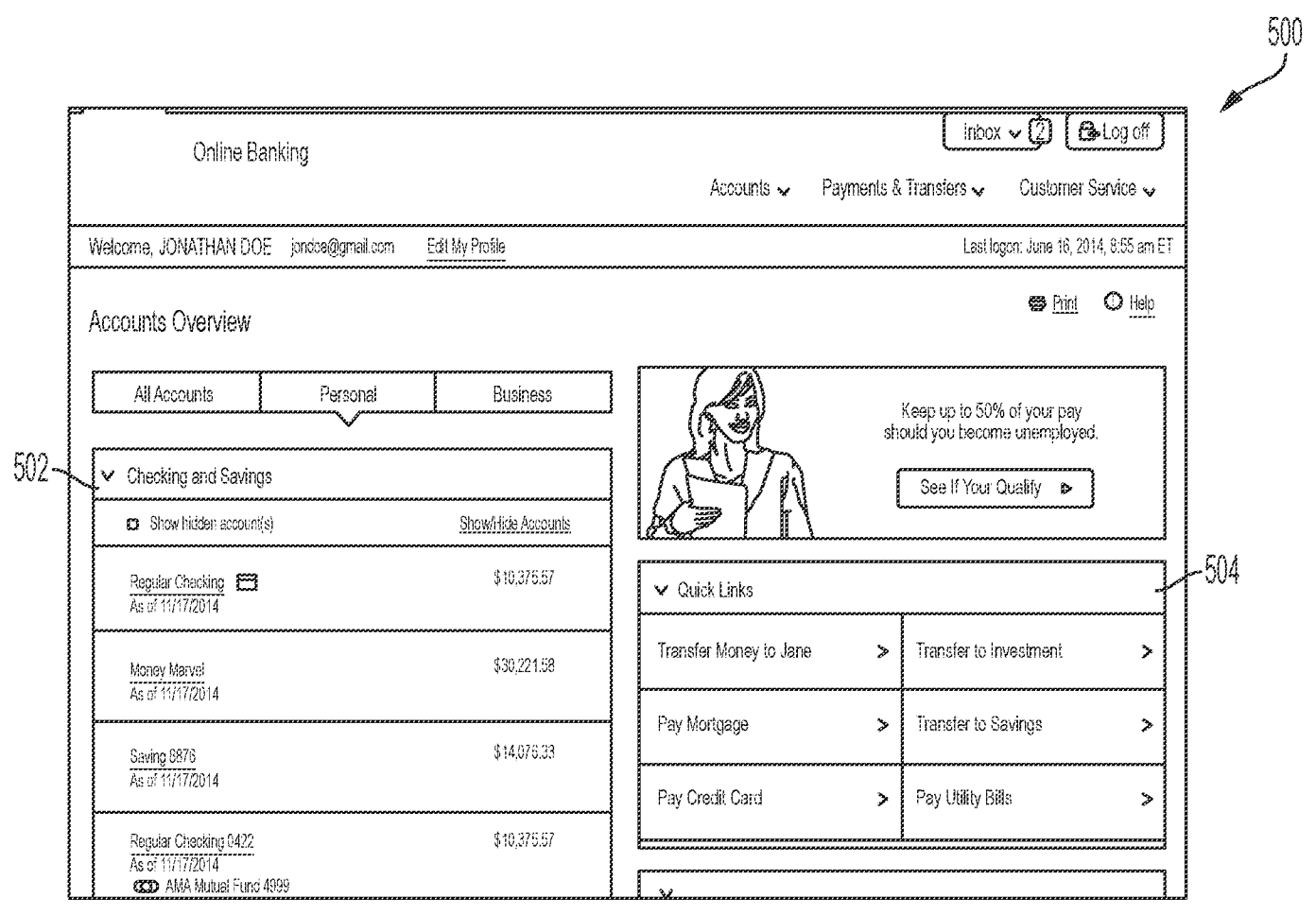

FIG. 5 is a user interface 500 of an accounts overview including a set of dynamically generated quick links 504 according to one example. The user interface 500 may be the first web page provided by the web server device 102 after the web server device 102 receives log in credentials from the user device 116. In additional examples, the user interface 500 may be a native application. The user interface 500 may include a categorization of accounts by type and provides the ability to switch among personal, business, or all accounts. Certain sections or options can be set closed or open. For example, selecting a heading such as "Checking and Savings" 502 can cause it to open or close. The settings may persist for the next time that the user logs into the user interface 500.

In an example, improved navigation through the user interface 500 can be provided with the quick links 504. In an example, the quick links 504 may be generated by the action implementation system 118 based on historical user interactions in the user interface 500. For example, the user may consistently use the user interface 500 to transfer money to a particular person, to make a mortgage payment, to pay a credit card, to transfer funds to an investment account, to transfer funds to a savings account, to pay utility bills, or to perform any other operations associated with the user accounts displayed in the user interface 500. For example, the quick links may generally include specific money transfers, bill payments, person-to-person payments, wire transfers, Automated Clearing House (ACH) transfers, payroll transfers, crypto-currency transfers, and investment transactions (e.g., buying and selling stocks, bonds, etc.).

In the illustrated example, the dynamic quick links 504 may be dynamically adjusted over time based on continued use by the user. For example, the order of the quick links 504 may be adjusted based on the frequency of use of the quick links. In some examples, the upper-left quick link may be the most often used quick link and the bottom right quick link may be the least often used quick link. Other arrangements of the quick links 504 are also contemplated. Further, the quick links that are not often used may be replaced on the user interface 500 by new quick links generated by the action implementation system 118. In some examples, the user may be prompted with suggestions for adding new quick links to the user interface 500.

In some examples, the user interface 500 may be automatically rearranged by the web server device 102 based on a type of device displaying the user interface 500. For example, the web server device 102 may remove or add elements displayed in the user interface 500 based on a type of user device with which the web server device 102 communicates. In an example where the user device is a mobile device with a smaller screen, the web server device 102 may reduce or otherwise limit a number of quick links 504 that are displayed in the user interface 500 to conserve screen space.

The foregoing description of the examples, including illustrated examples, of the subject matter has been presented only for the purpose of illustration and description and is not intended to be exhaustive or to limit the subject matter to the precise forms disclosed. Numerous modifications, adaptations, combinations, and uses thereof can be apparent to those skilled in the art without departing from the scope of the subject matter.

What is claimed is:

1. A system, comprising:
   a processing device; and
   a non-transitory computer-readable medium comprising instructions that are executable by the processing device to cause the processing device to perform operations, the operations comprising:
   receiving a trigger to generate a quick link;
   accessing user action information associated with a set of user device interactions with a user interface;
   determining, using at least one machine-learning model, at least one qualifying user device interaction of the set of user device interactions using the user action information, the at least one machine-learning model trained to identify the at least one qualifying user device interaction based on a likelihood that the at least one qualifying user device interaction is to be used by a user, the at least one machine-learning model further trained to determine the at least one qualifying user device interaction by:
   determining one or more quick links that minimize a number of user inputs to perform a particular user device interaction included in the set of user device interactions; and
   determining one or more user device interactions of the set of user device interactions that have a likelihood of occurring over a particular time period that exceeds a threshold likelihood of occurrence;
   generating at least one quick link that automatically performs an action associated with the at least one qualifying user device interaction upon manipulation of the at least one quick link by a user in the user interface;
   populating the user interface with the at least one quick link;
   tracking use of the at least one quick link; and rearranging the at least one quick link in the user interface based on a first frequency of the use of the at least one quick link, a second frequency of the at least one qualifying user device interaction after generating the at least one quick link, or a combination thereof.

2. The system of claim 1, wherein the operations further comprise:
accessing additional user action information associated with an additional set of user device interactions with the user interface, wherein the additional set of user device interactions occur subsequent to the user interface being populated with the at least one quick link;
determining at least one additional qualifying user device interaction of the additional set of user device interactions using the additional user action information;
generating at least one additional quick link that automatically performs an additional action associated with the at least one additional qualifying user device interaction upon manipulation of the at least one additional quick link by the user in the user interface; and
populating the user interface with the at least one additional quick link.

3. The system of claim 2, the operations further comprising:
removing at least one of the at least one quick link prior to populating the user interface with the at least one additional quick link.

4. The system of claim 1, wherein the set of user device interactions with the user interface comprise money transfers, bill payments, person-to-person payments, wire transfers, Automated Clearing House (ACH) transfers, payroll transfers, crypto-currency transfers, investment transactions, or any combination thereof.

5. The system of claim 1, the operations further comprising:
determining that a type of user device on which the user interface is displayable is a mobile computing device with a particular screen size that is usable to display the user interface;
determining a number of quick links to include in the at least one quick link based on the particular screen size; and
rearranging the number of quick links based on the type of user device being the mobile computing device with the particular screen size.

6. The system of claim 1, wherein the user interface comprises a web page or native application displayed on a user device.

7. A computer-implemented method, comprising:
receiving a trigger to generate a quick link;
accessing user action information associated with a set of user device interactions with a user interface;
determining, using at least one machine-learning model, at least one qualifying user device interaction of the set of user device interactions using the user action information, the at least one machine-learning model trained to identify the at least one qualifying user device interaction based on a likelihood that the at least one qualifying user device interaction is to be used by a user, the at least one machine-learning model further trained to determine the at least one qualifying user device interaction by:
determining one or more quick links that minimize a number of user inputs to perform a particular user device interaction included in the set of user device interactions; and
determining one or more user device interactions of the set of user device interactions that have a likelihood of occurring over a particular time period that exceeds a threshold likelihood of occurrence;
generating at least one quick link that automatically performs an action associated with the at least one qualifying user device interaction upon manipulation of the at least one quick link by a user in the user interface;
populating the user interface with the at least one quick link;
tracking use of the at least one quick link; and
rearranging the at least one quick link in the user interface based on a first frequency of the use of the at least one quick link, a second frequency of the at least one qualifying user device interaction after generating the at least one quick link, or a combination thereof.

8. The computer-implemented method of claim 7, further comprising:
accessing additional user action information associated with an additional set of user device interactions with the user interface, wherein the additional set of user device interactions occur subsequent to the user interface being populated with the at least one quick link;
determining at least one additional qualifying user device interaction of the additional set of user device interactions using the additional user action information;
generating at least one additional quick link that automatically performs an additional action associated with the at least one additional qualifying user device interaction upon manipulation of the at least one additional quick link by the user in the user interface; and
populating the user interface with the at least one additional quick link.

9. The computer-implemented method of claim 8, further comprising:
removing at least one of the at least one quick link prior to populating the user interface with the at least one additional quick link.

10. The computer-implemented method of claim 7, wherein the set of user device interactions with the user interface comprise money transfers, bill payments, person-to-person payments, wire transfers, Automated Clearing House (ACH) transfers, payroll transfers, crypto-currency transfers, investment transactions, or any combination thereof.

11. The computer-implemented method of claim 7, further comprising:
rearranging the at least one quick link based on a type of user device on which the user interface is displayed.

12. The computer-implemented method of claim 7, wherein the user interface comprises a web page or native application displayed on a user device.

13. A non-transitory computer-readable medium comprising instructions that are executable by a processing device for performing operations, the operations comprising:
receiving a trigger to generate a quick link;
accessing user action information associated with a set of user device interactions with a user interface;
determining, using at least one machine-learning model, at least one qualifying user device interaction of the set of user device interactions using the user action information, the at least one machine-learning model trained to identify the at least one qualifying user device interaction based on a likelihood that the at least one qualifying user device interaction is to be used by a user, the at least one machine-learning model further trained to determine the at least one qualifying user device interaction by:
- determining one or more quick links that minimize a number of user inputs to perform a particular user device interaction included in the set of user device interactions; and
- determining one or more user device interactions of the set of user device interactions that have a likelihood of occurring over a particular time period that exceeds a threshold likelihood of occurrence;

generating at least one quick link that automatically performs an action associated with the at least one qualifying user device interaction upon manipulation of the at least one quick link by a user in the user interface;

populating the user interface with the at least one quick link;

tracking use of the at least one quick link; and rearranging the at least one quick link in the user interface based on a first frequency of the use of the at least one quick link, a second frequency of the at least one qualifying user device interaction after generating the at least one quick link, or a combination thereof.

14. The non-transitory computer-readable medium of claim 13, wherein the operations further comprise:
- accessing additional user action information associated with an additional set of user device interactions with the user interface, wherein the additional set of user device interactions occur subsequent to the user interface being populated with the at least one quick link;
- determining at least one additional qualifying user device interaction of the additional set of user device interactions using the additional user action information;
- generating at least one additional quick link that automatically performs an additional action associated with the at least one additional qualifying user device interaction upon manipulation of the at least one additional quick link by the user in the user interface; and
- populating the user interface with the at least one additional quick link.

15. The non-transitory computer-readable medium of claim 14, wherein the operations further comprise:
- removing at least one of the at least one quick link prior to populating the user interface with the at least one additional quick link.

16. The non-transitory computer-readable medium of claim 13, wherein the set of user device interactions with the user interface comprise money transfers, bill payments, person-to-person payments, wire transfers, Automated Clearing House (ACH) transfers, payroll transfers, cryptocurrency transfers, investment transactions, or any combination thereof.

17. The non-transitory computer-readable medium of claim 13, wherein the operations further comprise:
- rearranging the at least one quick link based on a type of user device on which the user interface is displayed.

18. The system of claim 1, wherein each qualifying user device interaction of the at least one qualifying user device interaction has a corresponding likelihood of being used by the user that exceeds a threshold likelihood of being used by the user.

* * * * *